US009185432B2

(12) United States Patent
Benien et al.

(10) Patent No.: US 9,185,432 B2
(45) Date of Patent: Nov. 10, 2015

(54) METHOD AND SYSTEM FOR ENCODING A 3D IMAGE SIGNAL, ENCODED 3D IMAGE SIGNAL, METHOD AND SYSTEM FOR DECODING A 3D IMAGE SIGNAL (75) Inventors: Christian Benien, Eindhoven (DE); Bart G. B. Barenbrug, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 546 days.

(21) Appl. No.: 13/127,267

(22) PCT Filed: Nov. 3, 2009

(86) PCT No.: PCT/IB2009/054869
§ 371 (c)(1),
(2), (4) Date: May 3, 2011

(87) PCT Pub. No.: WO2010/052637
PCT Pub. Date: May 14, 2010

(65) Prior Publication Data
US 2011/0211043 A1 Sep. 1, 2011

(30) Foreign Application Priority Data
Nov. 4, 2008 (EP) .................................... 08168233

(51) Int. Cl.
*H04N 19/00* (2014.01)
*H04N 19/87* (2014.01)
*H04N 19/597* (2014.01)
*H04N 19/46* (2014.01)
*H04N 19/61* (2014.01)
*H04N 19/114* (2014.01)

(52) U.S. Cl.
CPC ............. *H04N 19/87* (2014.11); *H04N 19/114* (2014.11); *H04N 19/46* (2014.11); *H04N 19/597* (2014.11); *H04N 19/61* (2014.11)

(58) Field of Classification Search
USPC .................................................. 345/419, 640
See application file for complete search history.

(56) References Cited

U.S. PATENT DOCUMENTS

| 5,706,417 | A | * | 1/1998 | Adelson ........................ 345/640 |
| 6,348,918 | B1 | * | 2/2002 | Szeliski et al. ................ 345/419 |
| 6,466,207 | B1 | | 10/2002 | Gortler |
| 6,611,268 | B1 | | 8/2003 | Szeliski |
| 2008/0036763 | A1 | | 2/2008 | Chen et al. |

FOREIGN PATENT DOCUMENTS

| CN | 1427630 A | 7/2003 |
| EP | 1418766 A2 | 12/2004 |
| TW | 200822059 A | 5/2008 |
| WO | WO2006041261 A1 | 4/2006 |
| WO | WO 2006041261 A1 * | 4/2006 |
| WO | WO 2007113725 A2 * | 10/2007 ............... H04N 7/26 |
| WO | WO2007113725 A2 | 10/2007 |
| WO | WO2008032245 A2 | 3/2008 |
| WO | WO2008036763 A2 | 3/2008 |
| WO | WO 2009001255 A1 * | 12/2008 ............. H04N 13/00 |

* cited by examiner

*Primary Examiner* — Dave Czekaj
*Assistant Examiner* — Shanika Brumfield
(74) *Attorney, Agent, or Firm* — Larry Liberchuk (57) ABSTRACT In a method for encoding a 3D signal comprising layered-depth images, the viewing area of further layers are (background layers) made to differ in size and/or shape from the viewing area of a reference view (foreground layers) and the 3D image signal is provided this with appropriate scaling data expressing the relation between the reference view viewing area and the one or more further layer's viewing area.

13 Claims, 10 Drawing Sheets

METHOD AND SYSTEM FOR ENCODING A 3D IMAGE SIGNAL, ENCODED 3D IMAGE SIGNAL, METHOD AND SYSTEM FOR DECODING A 3D IMAGE SIGNAL

FIELD OF THE INVENTION

The invention relates to the field of 3D-image encoding and decoding. It presents a method and system for encoding a 3D image signal. The invention also relates to a method and system for decoding a 3D image signal. The invention also relates to an encoded 3D image signal.

BACKGROUND OF THE INVENTION

Recently there has been much interest in providing 3-D images on 3-D image displays. It is believed that 3-D imaging will be, after color imaging, the next great innovation in imaging. We are now at the advent of introduction of 3D displays for the consumer market.

A 3-D display device usually has a display screen on which the images are displayed. Basically, a three-dimensional impression can be created by using stereo images, i.e. two slightly different images directed at the two eyes of the viewer. An example of such a device is an autostereoscopic display. In other devices images are sent in all directions and glasses are used to block certain images to give a 3D perception.

Whatever type of 3-D display is used, the 3-D image information has to be provided to the display device. This is usually done in the form of a 3-D image signal comprising digital data.

The generation of 3-D images is conventionally done by adding a depth map, said depth map providing information on the depth of the pixel within the image and thus providing 3D information. Using the depth map for an image a left and right image can be constructed providing a 3D image as disclosed in U.S. Pat. No. 6,466,207 entitled "Real-time rendering with layered depth images". Alternatively, for example when using a multi-view autostereoscopic display, more than two views can be constructed for use in visualizing a three dimensional scene.

When the content is displayed on a display multiple views must be rendered and these are sent in different directions. A viewer will have different images on the eyes and these images are rendered such that the viewer perceives depth. The different views represent different viewing positions. However on the input data usually often one viewing angle is visible. Therefore the rendered views will have missing information in the regions behind e.g. foreground objects or information on the side of objects. Different methods exist to cope with this missing information. A solution is to add data to the signal in the form of further data layers representing parts of the 3D image that are hidden behind foreground objects. This background information is stored from the same viewing angle. There may be more than one layer of background information if in a 3D image many objects are positioned behind each other.

In such methods the content for 3D displays is stored in a multi-layer representation. This multi-layer representation captures the scene from the viewpoint of a single camera, and describes the third dimension with the help of layers. Such layers could contain transparency. Often, each layer is provided with a corresponding depth map. The layers behind the foreground layer are usually called 'occlusion layers'.

The inventors have found that in current methods part of the occlusion information useful for accurate construction of a 3D image cannot be represented in an occlusion layer. This reduces the quality of 3-D imaging, since the missing information must be rendered by some other manner, usually leading to some sort of method to estimate the content of the missing information. However intelligent such methods may be, the missing information is generally merely an approximation of the actual content, leading to the possibility of image errors and imperfect 3-D images.

It is thus an object of the invention to provide a method for encoding 3D image data allowing an improved 3-D imaging.

It is a further object to provide an improved system for encoding a 3D image signal, a system for decoding a 3D image signal and a 3D image signal.

SUMMARY OF THE INVENTION

To this end the method for encoding in accordance with the invention is characterized in that a 3D image signal is encoded, the encoded 3D image signal comprising a reference view data layer, and one or more further data layers for the reference view data layer, wherein the viewing areas covered by one or more further data layers and the reference view differ in size and/or shape and scaling data is generated expressing the relation between the reference view viewing area and the one or more further layer's viewing area.

In a system for encoding in accordance with the invention a 3D image signal is encoded comprising a reference view data layer and one or more further data layers, wherein the size and/or shape of the viewing areas covered by the reference view data layer and the one or more further data layers differ and scaling data is generated expressing the relation between the reference view viewing area and/or shape and the one or more further layer's viewing area.

A 3D image signal in accordance with the invention comprises a 3D image signal, the 3D image signal comprising a reference view data layer and one or more further data layers, wherein the viewing areas covered by the reference view data layer and the one or more further data layers differ in size and/or shape and the 3-D image signal comprises scaling data expressing the relation between the reference view viewing area and the one or more further layer's viewing area.

The system for decoding in accordance with the invention comprises an input for a 3D image comprising a reference view data layer and one or more further data layers, wherein the size and/or shape of the viewing areas covered by the various data layers differ, the 3D image signal comprising scaling data expressing the relation between the reference view viewing area and the one or more further layer's viewing area, the system for decoding comprising a means for controlling the viewing areas covered by the two or more data layers in dependence of the scaling data.

In current 2D plus Depth formats, the occlusion layers as well as the depth maps have the same aspect ratio and position as the foreground layer, i.e. the reference view data layer is the foreground data layer. The further data layers are the background data layers. The further data layers comprise information, in the form of data layers which allow a 3D image to be constructed. In current methods the various layers cover the same viewing area.

When a 3D view is rendered from a 2D plus Depth representation of a scene, objects that appear behind the screen are shifted in one direction, and objects that appear in front of the screen are shifted in the opposite direction. Which direction it is depends on whether a view to the left or the right of the central view is rendered. Typically although not necessarily, objects that appear in front of or close to the screen plane are in a foreground layer and the background layer(s) contain(s)

everything behind the foreground objects. Usually the foreground object is not shifted by the rendering, since it should appear at the screen plane. The whole background is then shifted into one direction, leading to a 'gap' or missing information at one side, e.g. if the background is moved 16 pixels to the left, information about the 16 pixels on the right side of the background layer is missing. The missing information cannot be retrieved The present invention solves the problem in the following manner: The size and/or shape of the viewing area covered by the further layer(s) and the reference view layer are different and scaling data is generated to express the relation between the covered viewing areas.

So, for instance for occlusion layers behind the reference view, occlusion layers having a viewing area bigger than the viewing area of foreground layer can be generated and the relation between the size and/or shape of viewing areas of the two data layers is indicated for instance with appropriate metadata. For most current rendering method, it is sufficient to increase the width of the occlusion layers, because there are only horizontal pixel shifts. The amount of increase may differ for various occlusion layers and thus the scaling data may differ. The scaling data express how the two layers can be matched. Preferably the scaling data also indicates the two layers which are matched.

In preferred embodiments the further layer data has the same resolution and shape as the reference view data, since usually it's best for compatibility to stick to standard resolutions. So for example both the reference view layer and the occlusion layer may be 1280×720, but the part of the occlusion layer which corresponds to the reference view viewing area may be for example the 1200×720 centered in the occlusion layer image to give more of a border in viewing area on the left and right sides of the occlusion layer. The viewing area of the occlusion layer is than larger than the viewing area of the reference view layer, in this example by a factor 1280/1200 in the horizontal direction.

In more sophisticated rendering methods it may be able to move the virtual camera used to render non-central views with more degrees of freedom. In such methods vertical pixel shifts, i.e. size and/or shape differences in vertical direction, may become advantageous. The viewing area of the occlusion layer(s) would then differ from the reference view's viewing area in a vertical direction. It will be clear to the skilled person that combinations encoding a larger viewing area in both horizontal and vertical direction as possible, optionally with a different number of additional pixels in horizontal and in vertical direction.

In a simple embodiment the metadata is realized by a rectangle in the occlusion layer that corresponds to the reference view data layer. This has the advantage, that the occlusion layers can automatically be stored in a different resolution and aspect ratio.

BRIEF DESCRIPTION OF THE DRAWINGS

These and further aspects of the invention will be explained in greater detail by way of example and with reference to the accompanying drawings, in which.

The figures are not drawn to scale. Generally, identical components are denoted by the same reference numerals in the figures.

DETAILED DESCRIPTION OF PREFERRED EMBODIMENTS

It is remarked that in the below given examples images are shown, what is shown for image data layers, is equally applicable for depth maps.

Figure 1:
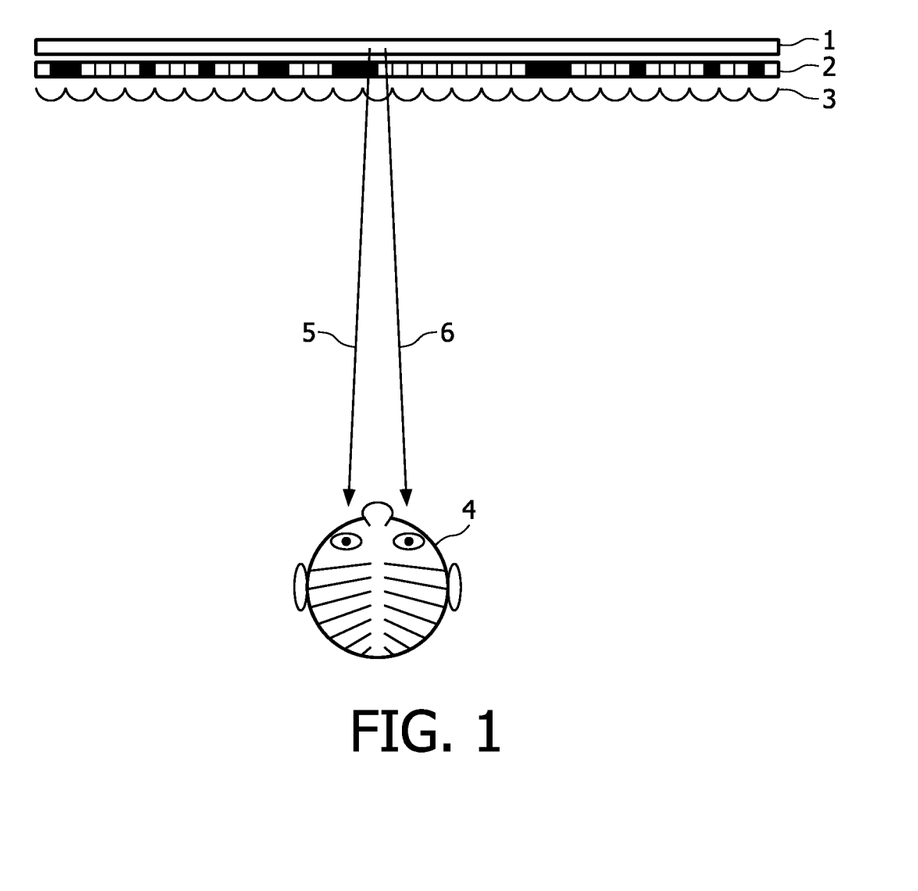
FIG. 1 illustrates an example of an auto-stereoscopic display device.

FIG. 1 illustrates the basic principle of a type of auto-stereoscopic display device. The display device comprises a lenticular screen splitting 3 for forming two stereo images 5 and 6. The vertical lines of two stereo images are (spatially) alternatingly displayed on, e.g., a spatial light modulator 2 (e.g. a LCD) with a backlight 1. Together the back light and the spatial light modulator form a pixel array. The lens structure of the lenticular screen 3 directs the stereo image to the appropriate eye of the viewer.

Figure 2:
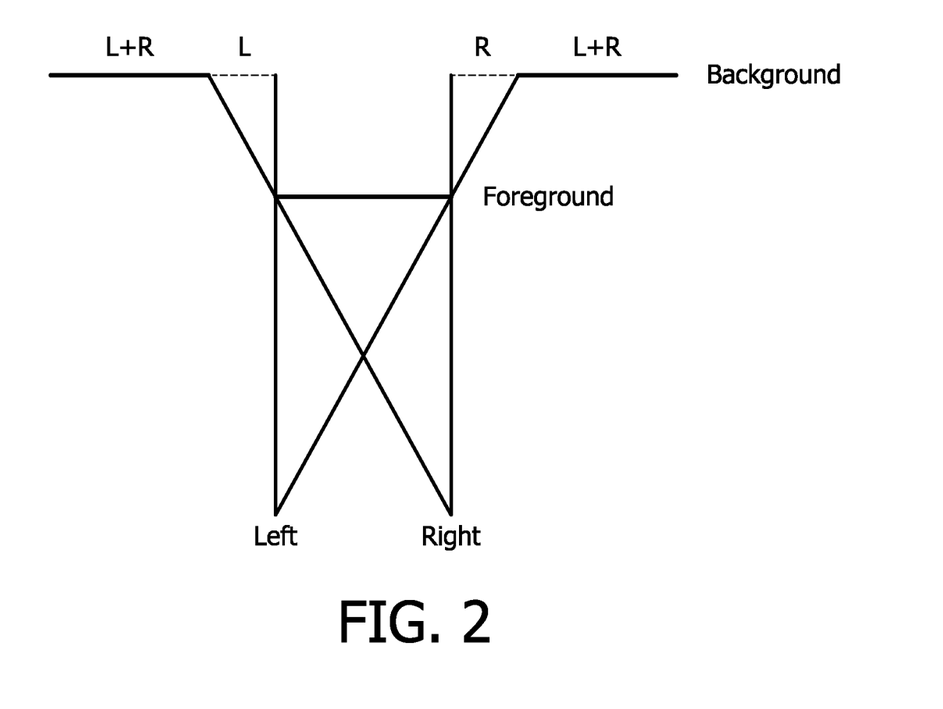
FIGS. 2 and 3 illustrate the occlusion problem.
Figure 3:
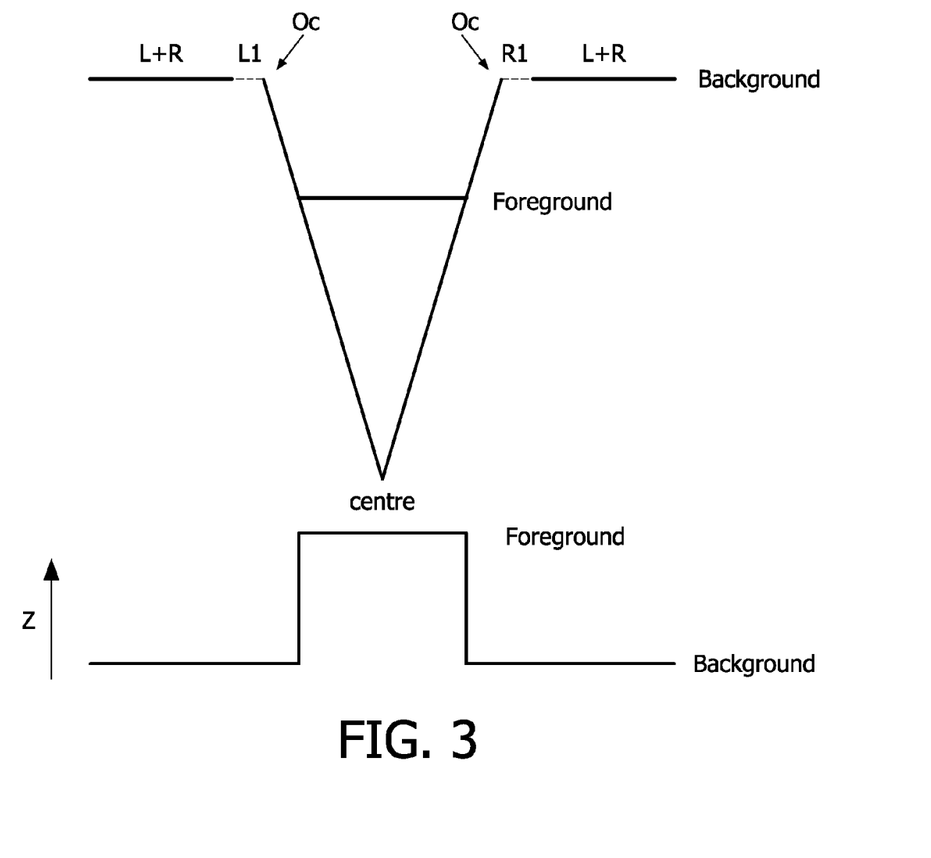

In FIGS. 2 and 3 the occlusion problem is illustrated. The line indicated with Background in this figure is the background and the line indicated with Foreground represents an object that is located in front of the background. Left and Right represent two views of this scene. These two views can be, for example, the left and the right view for a stereo set-up, or the two most outer views for the case of usage of a multi-view display. The lines denoted L+R can be observed by both views, whereas the L part can only be observed from the Left view and the R part only from the Right view. Hence the R part cannot be observed from the Left view, and similarly the L part cannot be observed from the Right view. In FIG. 3 centre indicates the centre view. As can be seen from this figure part (L1 respectively R1) of the L and R part of the background indicated in FIG. 3 can be seen from the centre view. However, a part of the L and R part is invisible from the centre view since it is hidden behind the foreground object. These areas indicated with Oc are areas that are occluded for the centre view but would be visible from the other views. As can be seen from the figure, the occlusion areas typically occur at the edges of foreground objects.

Generating 3-D data only from a centre view and a depth map poses a problem for the occluded areas. The data of parts of the image hidden behind foreground objects is unknown.

In known methods this is solved by generating the 3D image data in a layered structure wherein besides the reference view data, in this example the center view, further data layers are generated. Data is added to the 3D image signal in the form of further data layers representing parts of the 3D image that are hidden behind foreground objects. This background information is stored from the same viewing angle. There may be more than one layer of background information if in a 3D image many objects are positioned behind each other.

As will be clear to those skilled in the art the layered 3D image may, but need not be coded for the center view, instead if may e.g. also encode the left image of a stereo pair and associated depth information in order to enable rendering of the right image.

The inventors have found that in current methods part of the needed information cannot be represented in an occlusion layer. This reduces the quality of 3-D imaging, since the lost information must be rendered by some other manner, usually leading to some sort of method to guess the content of the missing information. However intelligent such methods may be the unrepresented information is never actually retrieved, leading to the possibility of image errors and imperfect 3-D images.

In current 2D plus Depth formats, the viewing area of the occlusion layers as well as the depth maps have the same aspect ratio and position, i.e. the same size and shape in viewing area, as the foreground layer, which can be seen as the reference view. When a 3D view is rendered from a 2D plus Depth representation of a scene, objects that appear behind the screen are shifted in one direction, and objects that appear in front of the screen are shifted in the opposite direction. Which direction it is depends on whether a view to the left or the right of the central view is rendered. Typically although not necessarily, objects that appear in front of or close to the screen plane are in a foreground layer and the background layer(s) contain(s) everything behind the foreground objects. Usually the foreground object is not shifted by the rendering, since it should appear at the screen plane. The whole background is then shifted into one direction, leading to a 'gap' or unrepresented information at one side, e.g. if the background is moved 16 pixels to the left, information about the 16 pixels on the right side of the background layer is not represented in the occlusion data layer. The not represented information cannot be retrieved.

The basic insight of the invention is to make the viewing area of further layers differ in size and/or shape from the viewing area of the reference view, for instance the foreground layer, and indicate in the 3D image signal this with appropriate metadata. For many cases, it is sufficient to increase the width of the viewing area of the occlusion layers, because we only have horizontal pixel shifts. More complex rendering methods will be able to move the virtual camera used to render non-central views with more degrees of freedom. In those cases also vertical pixel shifts may be needed. During encoding the difference in size or shapes can be calculated for instance from the various depth maps associated with the various layers and the viewing angles.

Figure 4:
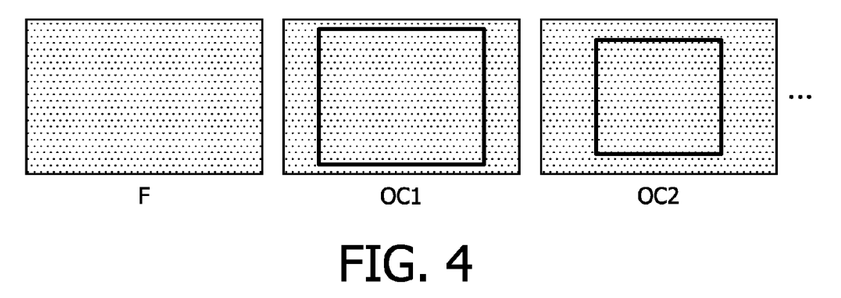
FIG. 4 illustrates a first example of the invention.

FIG. 4 illustrates a first example of the invention.

In this simple example it is assumed that the transmission system, video container or the video codec allow only a fixed resolution for all layers. FIG. 4 schematically illustrates a foreground layer F and a number of occlusion layers OC1, OC2. In each occlusion layer OC1, OC2, the rectangle indicates which region of the viewing area of the occlusion layer corresponds to the viewing area for the foreground layer F. Typically, occlusion layers OC2 that are behind another occlusion layer OC1 need to be larger in viewing area since the pixel shift during rendering is larger. In this case it means that rectangle corresponding to the viewing area of foreground layer F becomes smaller. The metadata can be realized by a rectangle in the occlusion layer that corresponds to the foreground layer. This has the advantage, that the occlusion layers can automatically be stored in a different resolution and aspect ratio.

Even if the video codec forces to store a fixed resolution for all layers, information can be added to the left and right of the occlusion layer by 'squeezing' it into the given resolution. Some horizontal resolution in the background is lost while gaining information about the left and right edges. Without the scaling data, it would be e.g. impossible for a background layer of the same resolution as the foreground layer to distinguish between a background layer at the same resolution as the foreground layer without any extension, and a background layer which is scaled down but has an extension which enlarges the overall background layer again to the original size. The scaling data can be stored as meta-data.

Larger background layers help even in case the foreground itself has depth other than screen depth at the edges, because we can now use the background layer to encode the missing information. Even if the content is originally just "single layer", (and thus a background layer is not necessary) the background layer can be used as extension to the left and right, e.g. by content creation software where the edges are filled manually or semi-automatically or are available from the content creation process.

Figure 5:
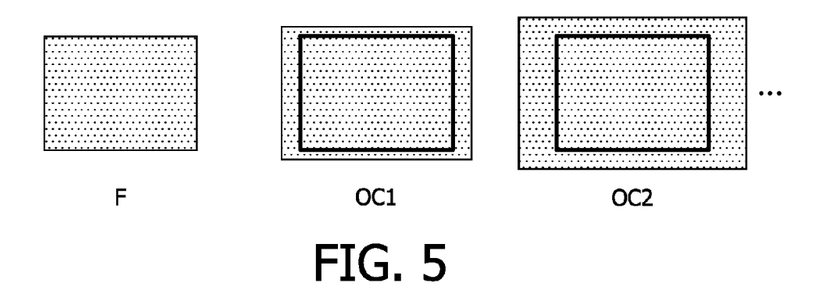
FIG. 5 illustrates a second example of the invention.

FIG. 5 illustrates a second example of the invention.

In this example occlusion layers are encoded in such a way that the region matching the foreground layer has the same number of pixels as the foreground layer itself. This is useful for most algorithms since no rescaling (and a resulting loss in precision) is required for rendering.

Further figures illustrate further example of the invention.

A. Non-Rectangular Shapes, FIGS. 6-11

Figure 6:
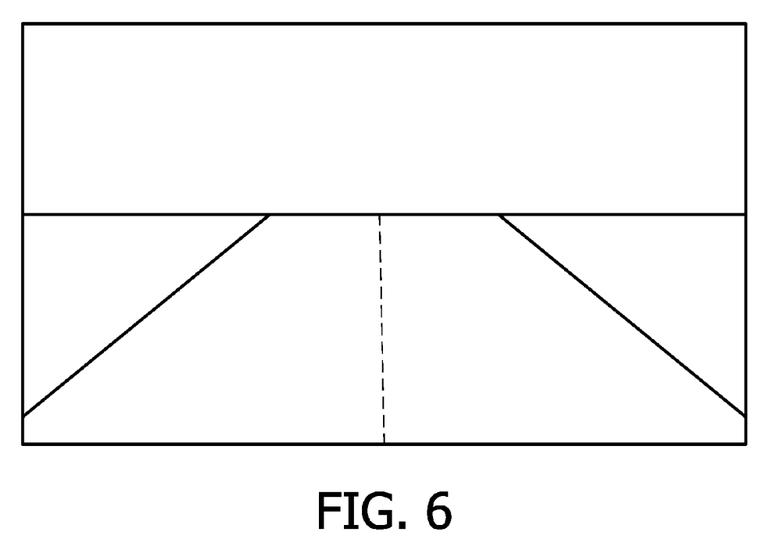
FIGS. 6 to 11 illustrate embodiments in which a non-rectangular shape is used to describe the area in the further layer corresponding to the foreground layer.
Figure 7:
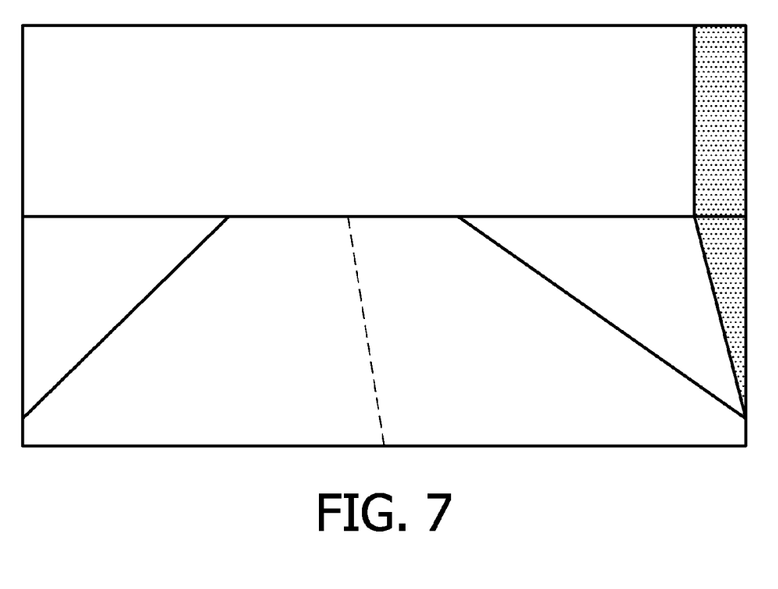
Figure 8:
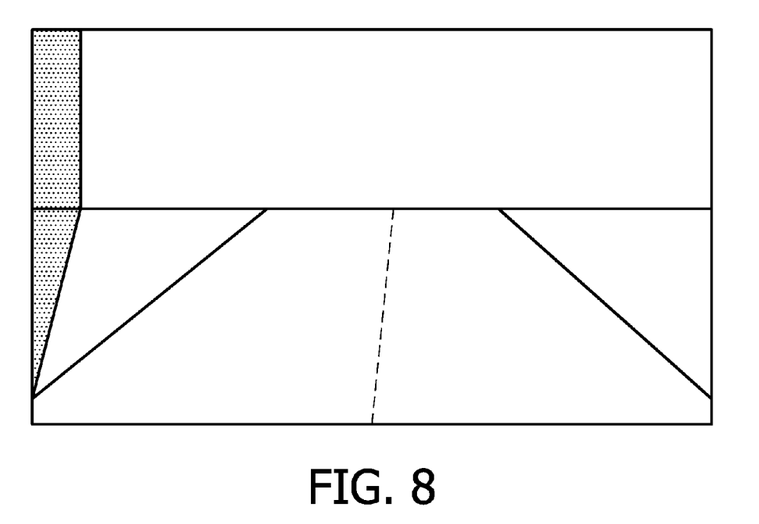
Figure 9:
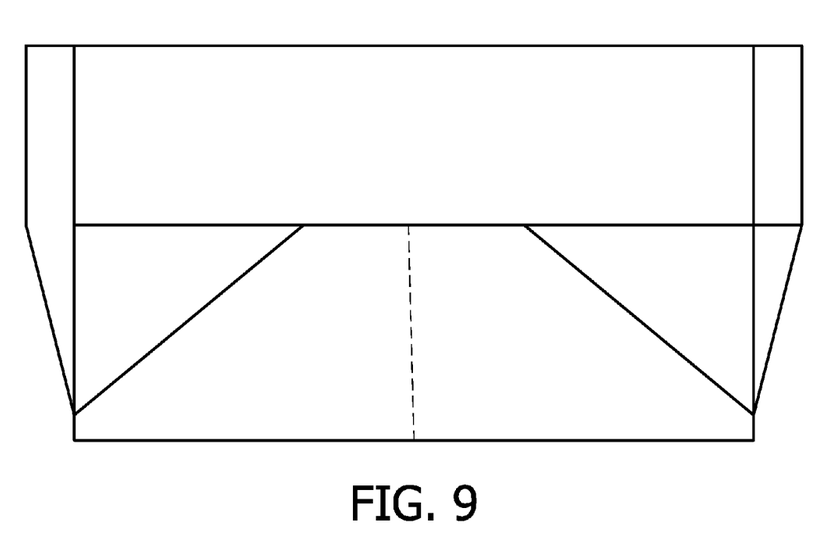
Figure 10:
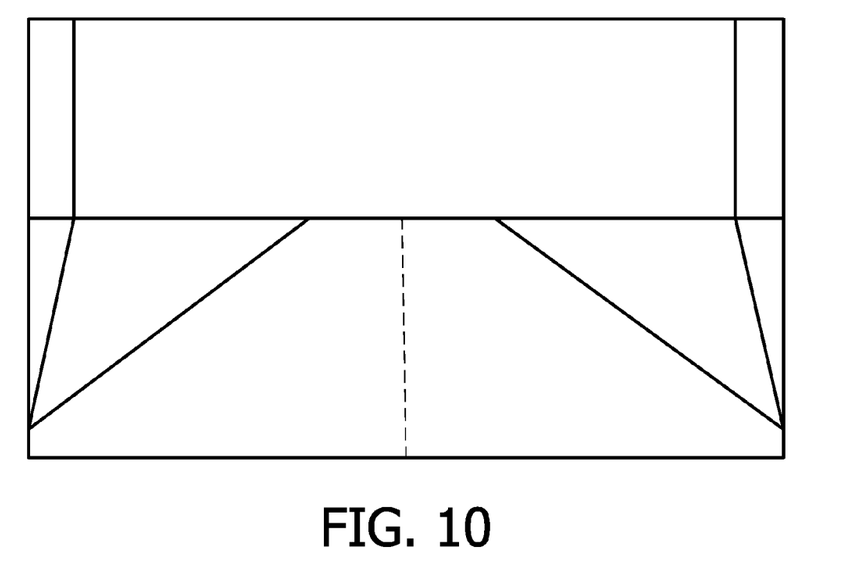
Figure 11:
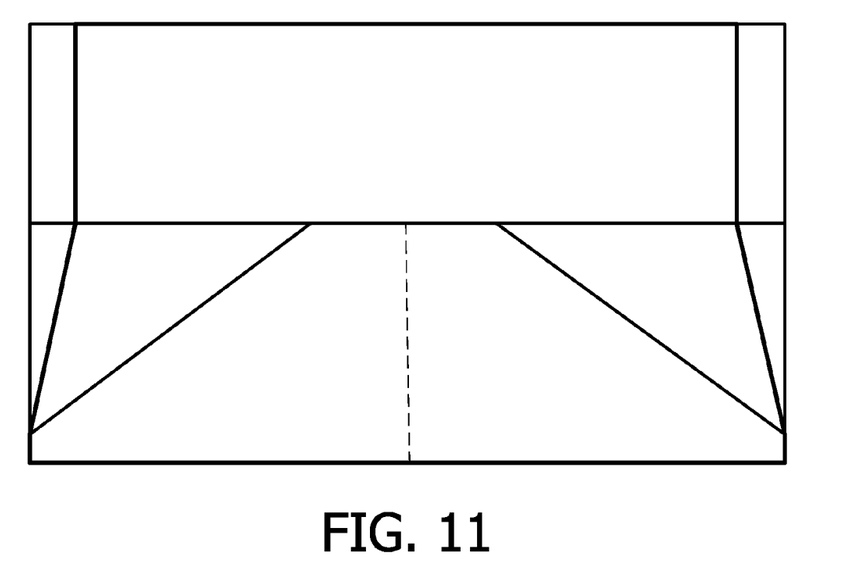

FIGS. 6-10 show an example where it's advantageous to use a non-rectangular shape to describe the area which corresponds to the viewing area of foreground layer. Suppose we have a scene of a road going off into the horizon (FIG. 6). A foreground layer may contain cars driving on this road, birds flying in the sky etc. FIG. 6 only depicts a background layer for such a scene. When viewed from the sides (FIGS. 7 and 8) the darkened areas show where background information from outside the original image is needed. This information may be available (e.g. from multi-view data, FIGS. 6-8). Adding these to the background layer results in FIG. 9. To be able to store this information in a rectangular video area, the lines of the image have to be squeezed horizontally (more at the top than at the bottom), resulting in FIG. 10. FIG. 11 shows in bold lines the area which corresponds to the foreground layer (e.g. FIG. 6 with foreground objects).

B. Non-Linear Scaling (FIGS. 12 and 13)

Figure 12:
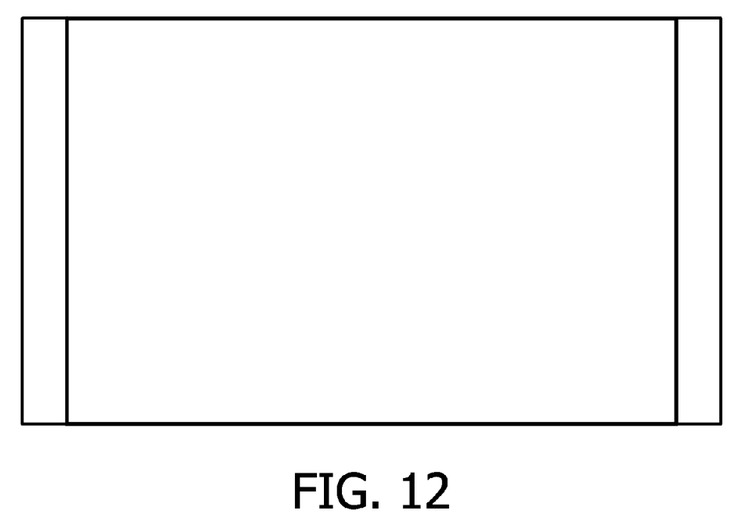
FIGS. 12 to 14 illustrate further examples of the invention.
Figure 13:
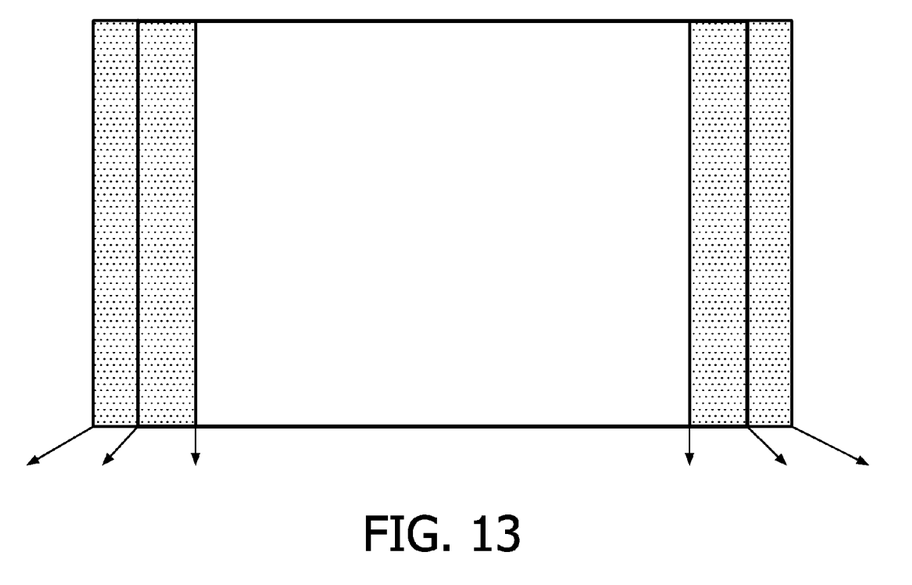

Suppose we have a background layer as depicted in FIG. 12 (in bold the corresponding foreground image area). It may be the case that in the middle of the image we want to have very precise correspondence between background and foreground. One option is to divide the background image into three areas: the middle area which has a 1:1 correspondence with the foreground, and the side areas (in grey in FIG. 13) which for example have to be expanded by a factor 2 (symbolized with the arrows at the bottom) to stretch the background to full foreground width and the extension beyond that. This way, compression of data to create the background layer is only done at the sides, while the middle part remains untouched.

This simple approach may result in artifacts at the newly introduced transition where the background magnification jumps between 1 and 2, so it may be appreciated that a more smooth transition of the scaling factor (e.g. through the use of splines) can also be applied.

In general, the mapping of coordinates between foreground and dependent layer can be a grid of control points with an arbitrary higher-order interpolation.

C. Other Layer Types/Sizes, FIG. 14

Figure 14:
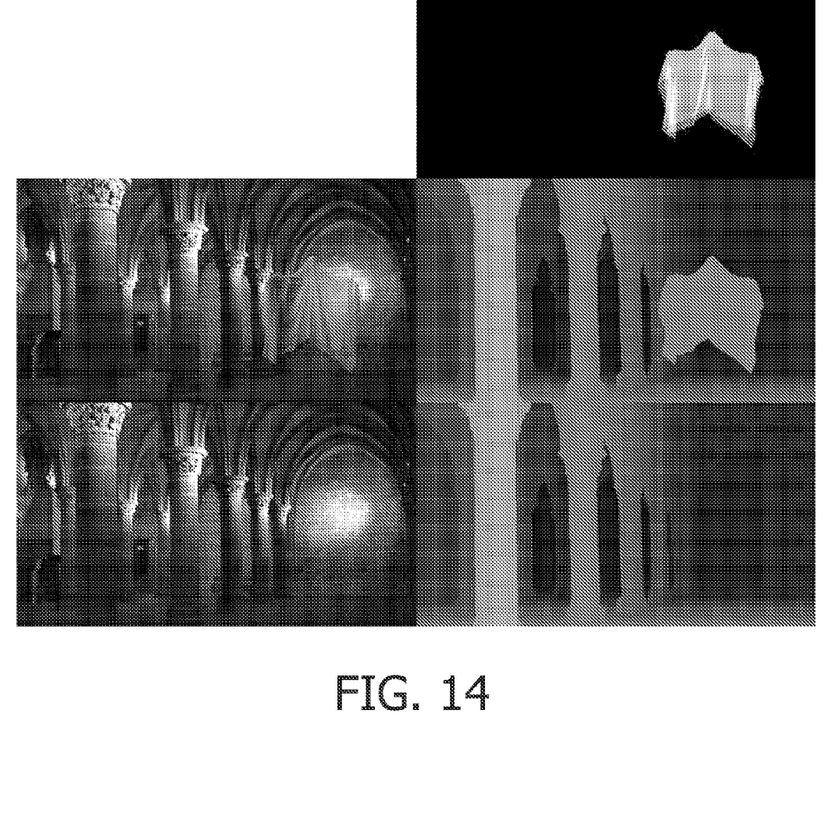

FIG. 14 shows a more advanced example: we have a foreground transparency data layer at the top right, foreground composite color and depth data layers in the middle row, and background color and depth data layers in the bottom row. The transparency layer does not need to be full size, but can be reduced to just the area with the ghost. In this case, the same goes for the background layer (image and depth). An alternate example (not depicted) could still have background information behind all pillars, requiring the background image and depth to still have (almost) the full size of the foreground/composite image, while the transparency layer could still have the reduced size of the example above. In the video from which this image is taken, the ghost moves right to left, so the area where transparency is needed remains small, i.e. the viewing area of the transparency data layer, but does move in respect of the viewing area of the reference view data layer, in this example the foreground composite color data layer, over time (i.e. the scaling meta-data can be animated over time).

In some cases it can be the case that for many de-occlusions, pixel repetition for the depth may provide sufficient quality, so that for those areas only occlusion image data may need to be stored (as pixel repetition can be performed at the receiver/rendering side for depth). This would result in a case where the area which would need to be stored for the background image would be different than the area for the background depth.

D. Different Layer as Reference View Layer.

It is possible to use a different layer than the foreground/composite layer as a reference for which for the further layers the corresponding viewing area is described in the scaling data. For example, if we have a scene looking through a keyhole, only a small area is needed for a background layer. We can indicate a rectangle in that background area which is a lot larger than the actual background image to signify the corresponding foreground area. But alternatively we can also indicate in the foreground layer which is the area where the background image is valid.

There are several ways to generate the scaling data, which are preferably in the form of meta-data. Below are some embodiments.

When compositing layers, the background layer may simply be larger than the final composite, and the additional information and its location may be ascertained from the original layer information, how the layers are positioned with respect to each other, and which "crop selection" is used as a final (foreground) viewport.

Alternatively, FIGS. 6-11 show how the extra information and the viewing area description may be ascertained from multi-view information.

Alternatively, when splitting a video to be shown on a vidi-wall (like for example the "WOWzone" product of Philips 3D Solutions), the background layers of the tiles into which the video is divided may be cropped from the total image in a different manner than the foreground layer cropping (to the point where the background layers of the tiles may even overlap).

Alternatively, in a plug-in for a computer graphics rendering system (such a 3D Studio Max, Blender, Maya), which renders different layers in different rendering passes, the viewport and/or output resolution may be changed between render passes, and those changes stored as meta-data along with the different layers to signify the correspondence between layers.

Alternatively, a compositor could analyze the input layers and for example for the aforementioned key hole example see that only a small part of the background layer would be needed, and store only that part and the meta-data describing which part was selected.

Alternatively, a compositor could use texture inpainting methods to fill the background when the original background information is not large enough and create appropriate meta-data. High-quality texture inpainting methods are slow and currently not suitable for implementation in displays, so it makes sense to apply them offline.

Figure 15:
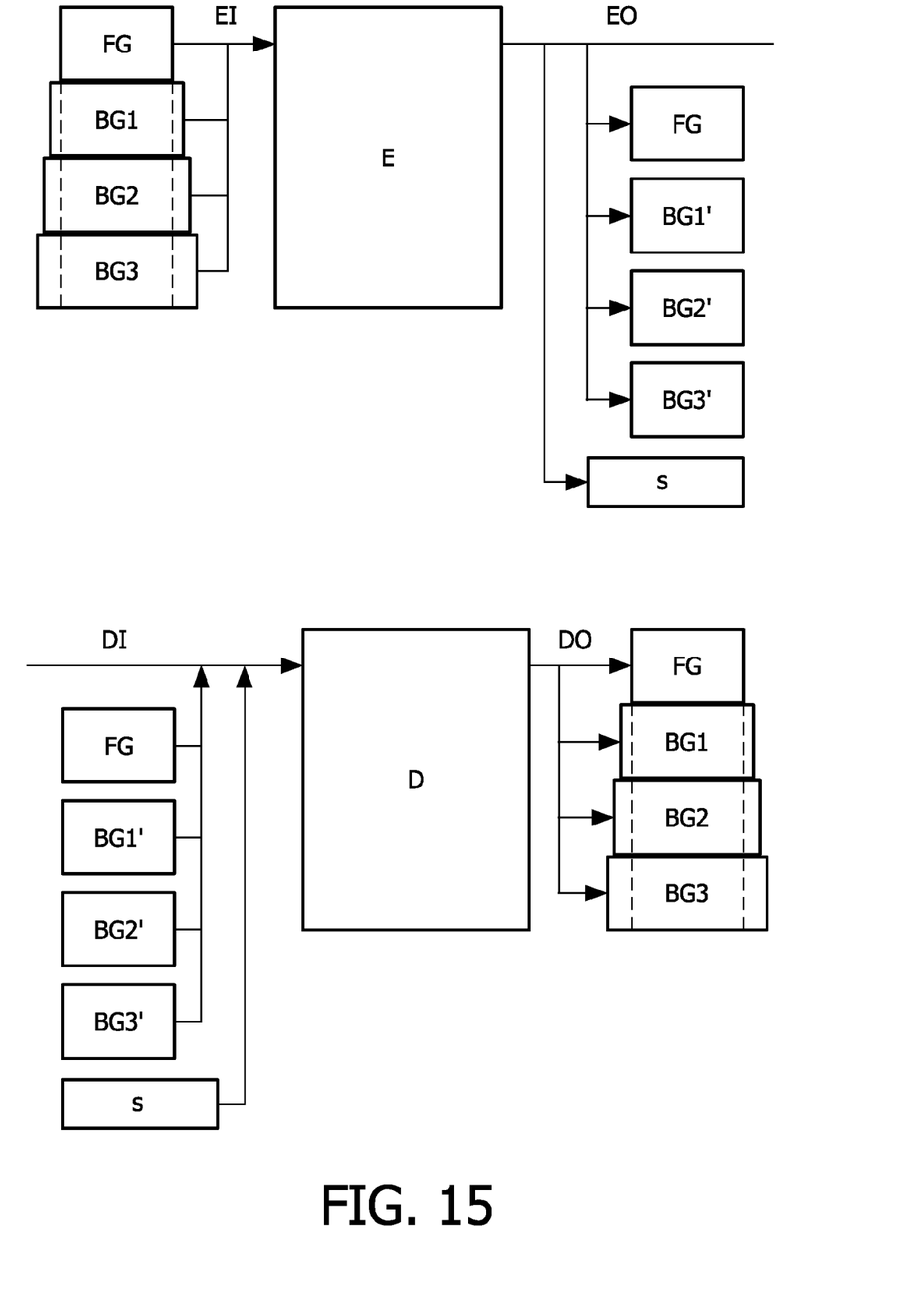
FIG. 15 illustrates an encoding system and a decoding system in accordance with the invention.

FIG. 15 schematically illustrates en encoding system in accordance with an embodiment of the invention as well as a decoding system in accordance with an embodiment of the invention. The encoder input EI comprises a foreground data image FG and a number of background images BG1 to BG3 of varying sizes. The encoding system according to the present invention comprises an encoder/encoding processor E arranged to encode the encoder input into encoder output signal EO. The encoder output signal comprising a foreground data layer FG corresponding to the foreground data image FG as well as scaled back ground layers BG1' to BG3' each corresponding to a respective one of the background images BG1 to BG3 as well as the associated scaling data.

The encoder output EO in turn may be used as input image data signal DI for the decoding system. The input data signal DI comprises a layered data structure, in this example comprising the foreground data layer FG and a number of background data layers BG1' to BG3'. The image input data signal DI also comprises scaling data s which comprises the scaling data s providing the scaling between viewing areas of the various data layers. The output of the decoding processor/decoder D provides the various data layers comprising for the background layers rectangles indicating the area of the background layer corresponding to the viewing area of the foreground layer. The decoder scales the background data layers such that the area in the background layers corresponding to the viewing area of the foreground layer is of the same size as the foreground layer.

It will be clear to the skilled person that the encoding processor E and the encoding processor D, may also be arranged to generate an encoder output signal EO/decoder input signal DI for embodiments wherein no scaling data is required; i.e. for an embodiment wherein the encoded output signal/input signal for decoding includes the layers FG, BG1, BG2 and BG3 unscaled, as originally provided.

It will be appreciated that the above description for clarity has described embodiments of the invention with reference to a single decoding/encoding processor. However, it will be apparent that any suitable distribution of functionality between different functional units or processors may be used without detracting from the invention. Hence, references to the decoding/encoding processor are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method for encoding a 3D image signal, the encoded 3D image signal comprising a reference view data layer and one or more background data layers for the reference view data layer, wherein viewing areas covered by the one or more background data layers and the reference view data layer differ in size or shape, and the reference view data layer and the one or more background data layers provide data for different viewing directions, the method comprising:
generating scaling data between the reference view data layer and the one or more background data layers in order to express a relation between the viewing area covered by the reference view data layer and the viewing area covered by the one or more background data layers for the different viewing directions;
wherein the viewing area covered by the one or more background data layers is scaled by the scaling data such that an edge of the viewing area covered by the one or more background data layers matches a corresponding edge of the viewing area covered by the reference view data layer along a viewing direction.

2. The method for encoding as claimed in claim 1, wherein the scaling data is generated as metadata.

3. The method for encoding as claimed in claim 1, wherein the scaling data describes that the size of the viewing area covered by the reference view data layer and the size of the viewing area covered by the one or more background data layers differ only in a horizontal direction.

4. The method for encoding as claimed in claim 1, wherein the scaling data describes a non-rectangular shape.

5. The method for encoding as claimed in claim 1, wherein the scaling data describes non-linear scaling.

6. The method for encoding as claimed in claim 1, wherein the reference view data layer is a foreground data layer.

7. A non-transitory computer readable medium embedded with program code which, when executed by a processor, causes the processor to perform the encoding method as claimed in claim 1.

8. A system for encoding a 3D image signal comprising a reference view data layer and one or more background data layers, wherein a size or shape of viewing areas covered by the reference view data layer and the one or more background data layers differ, and the reference view data layer and the one or more background data layers provide data for different viewing directions, the system comprising:
a processor configured to encode the reference view data layer and the one or more background data layers and to generate scaling data between the reference view data layer and the one or more background data layers in order to express a relation between the viewing area covered by the reference view data layer and the viewing area covered by the one or more background data layers for the different viewing directions; and
an output port for outputting the encoded 3D image signal;
wherein the viewing area covered by the one or more background data layers is scaled by the scaling data such that an edge of the viewing area covered by the one or more background data layers matches a corresponding edge of the viewing area covered by the reference view data layer along a viewing direction.

9. A non-transitory computer readable medium embedded with a 3D image signal comprising a reference view data layer and one or more background data layers, wherein viewing areas covered by the reference view data layer and the one or more background data layers differ in size or shape and the reference view data layer and the one or more background data layers provide data for different viewing directions, and the 3-D image signal further comprises scaling data between the reference view data layer and the one or more background data layers to express a relation between the viewing area covered by the reference view data layer and the viewing area covered by the one or more background data layers for the different viewing directions; wherein the viewing area covered by the one or more background data layers is scaled by the scaling data such that an edge of the viewing area covered by the one or more background data layers matches a corresponding edge of the viewing area covered by the reference view data layer along a viewing direction.

10. The non-transitory computer readable medium as claimed in claim 9, wherein the scaling data is in a form of meta-data.

11. A method for decoding a 3D image signal comprising a reference view data layer and one or more background data layers, wherein viewing areas of the various data layers differ, and the reference view data layer and the one or more background data layers provide data for different viewing directions, the 3D image signal further comprising scaling data between the reference view data layer and the one or more background data layers to express a relation between the viewing area of the reference view data layer and the viewing area of the one or more background data layers for the different viewing directions, the method for decoding comprising:
matching sizes or shapes of two or more data layers in dependence of the scaling data;
wherein the viewing area covered by the one or more background data layers is scaled by the scaling data such that an edge of the viewing area covered by the one or more background data layers matches a corresponding edge of the viewing area covered by the reference view data layer along a viewing direction.

12. A non-transitory computer readable medium embedded with program code which, when executed by a processor, causes the processor to perform the decoding method as claimed in claim 11.

13. A system for decoding comprising:
an input port for receiving a 3D image signal comprising a reference view data layer and one or more background data layers, wherein a size or shape of viewing areas of various data layers differ, and the reference view data layer and the one or more background data layers provide data for different viewing directions, the 3D image signal further comprising scaling data between the reference view data layer and the one or more background data layers to express a relation between the viewing area of the reference view data layer and the viewing area of the one or more background data layers for the different viewing directions; and a processor configured to match the viewing areas covered by the two or more data layers in dependence of the scaling data;

wherein the viewing area covered by the one or more background data layers is scaled by the scaling data such that an edge of the viewing area covered by the one or more background data layers matches a corresponding edge of the viewing area covered by the reference view data layer along a viewing direction.

* * * * *